United States Patent
Retivykh et al.

(10) Patent No.: US 12,095,896 B1
(45) Date of Patent: Sep. 17, 2024

(54) FULLY HOMOMORPHIC ENCRYPTION AND DECRYPTION APPARATUS AND METHOD FOR OPERATING THE SAME

(71) Applicant: Fhela Inc, Dover, DE (US)

(72) Inventors: Vladimir Retivykh, Dover, DE (US); Grigori Leshenko, Dover, DE (US); Aleksei Retivykh, Dover, DE (US); Dmitrii Anokhin, Surat Thani (TH)

(73) Assignee: Fhela Inc, Dover, DE (US)

( * ) Notice: Subject to any disclaimer, the term of this patent is extended or adjusted under 35 U.S.C. 154(b) by 0 days.

(21) Appl. No.: 18/420,897

(22) Filed: Jan. 24, 2024

(51) Int. Cl.
*H04L 9/00* (2022.01)
*H04L 9/08* (2006.01)

(52) U.S. Cl.
CPC ............ *H04L 9/008* (2013.01); *H04L 9/0869* (2013.01)

(58) Field of Classification Search
CPC ..... H04L 9/008; H04L 9/0869; H04L 9/0656; H04L 9/0662; H04L 9/0668; H04L 9/08; H04L 9/00
See application file for complete search history.

(56) References Cited

U.S. PATENT DOCUMENTS 7,912,138 B2 * 3/2011 Geile ................. H04N 21/6118
370/208
2023/0025754 A1 * 1/2023 Hassanzadeh .......... H04L 9/008

* cited by examiner

*Primary Examiner* — Quazi Farooqui
(74) *Attorney, Agent, or Firm* — Nadya Reingand (57) ABSTRACT

A fully homomorphic encryption and decryption apparatus and method are provided, which provide efficient (in terms of computational speed and resource consumption) encryption and decryption operations in fully homomorphic encryption schemes. The apparatus comprises a control module configured to obtain a secret key (SK) in response to a configuration message and provide the SK to both encryption and decryption modules via an interconnect bus. The encryption module is configured to obtain a public key (PK), encrypt a plaintext into a ciphertext based on the PK and SK, divide the ciphertext into a set of ciphertext slices based on a PK length and an interconnect bus width, and concurrently provide the set of ciphertext slices together with the PK to the decryption module. The decryption module is configured to concatenate the set of ciphertext slices into the ciphertext and decrypt the ciphertext into the plaintext based on the PK and SK.

8 Claims, 5 Drawing Sheets

P — paralleling depth (power of 2): $P = 2^p = 1..4096$, $p = 0..12$
C — ciphertext bit-length (power of 2): $C = 2^c = 64..4096$, $c = 6..12$
B — interconnect bus width: 32, 64, 128 bits
L — public key length (secret key bit-width): $L = 2^l - 1 = 1..4095$, $l = 1..12$
M — user bus width: 32, 64 bits

- - - -> From IO control unit

FULLY HOMOMORPHIC ENCRYPTION AND DECRYPTION APPARATUS AND METHOD FOR OPERATING THE SAME

TECHNICAL FIELD

The present disclosure generally relates to the field of data encryption and decryption. In particular, the present disclosure relates to a fully homomorphic encryption and decryption apparatus, as well as to a method for its operation.

BACKGROUND OF THE INVENTION

With the advent of quantum computers, traditional encryption schemes, such as Rivest-Shamir-Adleman (RSA) and elliptic-curve cryptography (ECC), are no longer able to provide a necessary level of security. Post-quantum cryptographic schemes that rely on complex relationships between elements of ciphertexts come to the forefront. One such approach is fully homomorphic encryption (FHE), which enables hidden computations on ciphertexts in addition to the encryption itself.

The possibility of FHE was first demonstrated by Craig Gentry in 2009. Despite the proposed bit-level scheme, many researchers picked up this implementation and were able to develop it over time for larger bit sizes. The main challenge here is to find a problem that even a quantum computer cannot solve in polynomial time (which is referred to as an NP-complete problem). One class of such problems consists in finding the shortest vectors in ideal lattices, known as learning with errors (LWE). The basis of these problems lies in representing secret information as equations with errors (noise). Regarding LWE, the problem is formulated as follows:

$$(a, ct) = \langle a, s \rangle_q + m \cdot \Delta + r \bmod q, \langle a, s \rangle_q = \sum_{i=0}^{L-1} a_i s_i \bmod q.$$

Here, a and s are the public and secret keys, respectively: $a=[a_0, a_1, \ldots, a_{L-1}]$, $s=[s_0, s_1, \ldots, s_{L-1}]$, where $s_i=\{0,1\}$, q is the modulus equal to $2^C$, C is the bit-length of the ciphertext ct, m is the message, $\Delta$ is the scaling factor equal to a power of two, and r is the noise such that $\Delta > r$. The public key is also referred to as the ciphertext mask, and the value ct is its body.

The decryption scheme is as follows (pt—decrypted message):

$$pt = \left\lfloor \frac{ct - \langle a, s \rangle_q}{\Delta} \right\rfloor.$$

By its nature, computations within homomorphic encryption schemes require the execution of numerous computational operations and generate a large volume of data. This, in turn, reduces the speed of performing computational operations and imposes high requirements on the performance of hardware resources. As a result, the development of hardware solutions to accelerate these operations becomes a priority task when building ecosystems based on FHE.

SUMMARY OF THE INVENTION

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that provides efficient (in terms of computational speed and resource consumption) encryption and decryption operations in FHE schemes.

The objective above is achieved by the features of the independent claims in the appended claims. Further embodiments and examples are apparent from the dependent claims, the detailed description, and the accompanying drawings.

According to a first aspect, a fully homomorphic encryption and decryption apparatus is provided. The apparatus comprises an encryption module, a decryption module, a control module, and an interconnect bus having a bus width and configured to connect the encryption module, the decryption module and the control module to each other.

The control module is configured to receive a configuration message comprising: (i) information about a source for a public key (PK); (ii) information about a source for a secret key (SK); (iii) a scaling shift; and (iv) a number of noise bits. The control module is further configured to obtain the SK based on the information about the source for the SK. The control module is then configured, via the interconnect bus, to provide the SK, the information about the source for the PK, the number of noise bits, and the scaling shift to the encryption module, as well as provide the SK, the number of noise bits, and the scaling shift to the decryption module.

The encryption module is configured to obtain the PK based on the information about the source for the PK. The encryption module is further configured to receive a plaintext and encrypt the plaintext into a ciphertext by performing the following sequence of operations: left-shifting the plaintext by a number of bits defined by the scaling shift; adding the number of noise bits to the plaintext; obtaining the ciphertext by combining the plaintext with a scalar product of the PK and the SK. The encryption module is then configured to divide the ciphertext into a set of ciphertext slices based on the bus width of the interconnect bus and a bit length of the ciphertext. After that, the encryption module is configured to concurrently provide each ciphertext slice of the set of ciphertext slices together with the PK to the interconnect bus.

The decryption module is configured to concatenate the set of ciphertext slices into the ciphertext. Then, the decryption module is configured to retrieve the plaintext from the ciphertext by performing the following sequence of operations: subtracting the scalar product of the PK and the SK from the ciphertext; subtracting the number of noise bits from the ciphertext; and obtaining the plaintext by right-shifting the ciphertext by the number of bits defined by the scaling shift.

The apparatus thus configured is applicable for various scenarios of accelerating homomorphic computations and is not tied to a specific accelerator architecture. It may be a component of a cryptographic processor that accelerates encryption and decryption operations in FHE schemes, especially based on the Learning with Errors (LWE) problem. Encryption and decryption in LWE schemes are fundamental blocks for all other schemes in the XLWE algorithm family. Furthermore, the apparatus thus configured may be applicable for:
  machine learning for building artificial intelligence (AI) systems on encrypted data sets without revealing the data sets.

processing and protecting personal data, exchanging encrypted data between different government and commercial entities, both within a single country and internationally (tax information, financial transactions, intelligence data, etc.);

implementing government procedures (e.g., voting) and supporting various government social programs and projects (e.g., "smart cities");

exchange, processing, and analysis of encrypted data in sectors where data confidentiality is crucial, such as the banking sector (protection against carding and encrypted tokenized payment processing), insurance, financial operations, and healthcare;

biometric data processing and analysis;

organizing a network infrastructure based on hardware solutions utilizing FHE;

statistical analysis using encrypted data; and usage in location monitoring systems (GPS, GLONASS, etc.) without revealing location data.

In one exemplary embodiment of the first aspect, the encryption module comprises at least one random number generator (RNG), and the information about the source for the PK indicates the at least one RNG as the source for the PK and a target length of the PK. In this embodiment, the encryption module is configured to obtain the PK by triggering the at least one RNG based on the target length of the PK. In doing so, it is possible to generate the PK more efficiently, thereby improving the efficiency of fully homomorphic encryption and decryption.

In one other exemplary embodiment of the first aspect, the encryption module comprises a memory sub-module configured to store a set of PKs each having a different PK length, and the information about the source for the PK indicates the memory sub-module as the source for the PK and a target length of the PK. In this embodiment, the encryption module is configured to obtain the PK by accessing the memory sub-module and selecting the PK from the set of PKs based on the target length of the PK. In doing so, it is possible to obtain the PK more efficiently, thereby improving the efficiency of fully homomorphic encryption and decryption.

In one exemplary embodiment of the first aspect, the information about the source for the SK indicates, as the source for the SK, an external user device connectable with the apparatus. In this embodiment, the control module is configured to receive the SK from the external user device. Such an embodiment may be advantageous as it avoids using computational resources to generate (e.g., by means of one or more RNGs) the SK in the control module itself.

In one other exemplary embodiment of the first aspect, the control module comprises a memory sub-module configured to store a set of SKs, and the information about the source for the SK indicates the memory sub-module as the source for the SK and a target length of the SK. In this embodiment, the control module is configured to obtain the SK by accessing the memory sub-module and selecting the SK from the set of SKs based on the target length of the SK. In doing so, it is possible to obtain the SK more efficiently, thereby improving the efficiency of fully homomorphic encryption and decryption.

In one exemplary embodiment of the first aspect, each of the encryption module, the decryption module and the control module is implemented based on at least one of a Field-Programmable Gate Arrays (FPGA) and an Application Specific Integrated Circuits (ASIC). The ASIC and FPGA architectures are characterized by their flexibility in configuration. For example, they comprise different configurable parameters which may be set at the assembly stage based on specific tasks to be solved. The configurable parameters may include, but not limited to, a degree of parallelism (which affects a computation speed and ranges from 1 to 4096), a maximum ciphertext length (which affects a cryptographic strength, a volume of encrypted data in a single ciphertext and a potential number of operations without bootstrapping; this parameter ranges from 32 to 4096), a ciphertext length (which affects decryption complexity and ranges from 1 to 4096), and an output bus width (which affects an information exchange speed between the apparatus and external devices; options: 16, 32, 64, 128).

In one exemplary embodiment of the first aspect, the encryption module is configured to perform all the encryption-related operations in $CL/P^2+2$ clock cycles, and the decryption module is configured to perform all the decryption-related operations in $CL/P^2+1$ clock cycles, where C is the bit length of the ciphertext, L is a PK length of the PK, and P is a degree of parallelism provided by each of the encryption module and the description module. This may guarantee faster operation of the apparatus compared to prior art analogues.

According to a second aspect, a method for operating the apparatus according to the first aspect is provided. The method starts with the step of receiving, by the control module, a configuration message comprising: (i) information about a source for a PK; (ii) information about a source for a SK; (iii) a scaling shift; and (iv) a number of noise bits. Then, the method proceeds to the step of obtaining, by the control module, the SK based on the information about the source for the SK. Next, the method goes on to the steps in which the control module provides, via the interconnect bus, the SK, the information about the source for the PK, the number of noise bits, and the scaling shift to the encryption module and the SK, the number of noise bits, and the scaling shift to the decryption module. Further, the method proceeds to the steps in which the encryption module obtains the PK based on the information about the source for the PK, receives a plaintext, left-shifts the plaintext by a number of bits defined by the scaling shift, adds the number of noise bits to the plaintext, and obtains a ciphertext by combining the plaintext with a scalar product of the PK and the SK. After that, the method goes on to the steps in which the encryption module divides the ciphertext into a set of ciphertext slices (or fragments) based on the bus width of the interconnect bus and a bit length of the ciphertext and concurrently provides each ciphertext slice of the set of ciphertext slices together with the PK to the interconnect bus. Subsequently, the method proceeds to the steps in which the decryption module concatenates the set of ciphertext slices into the ciphertext, subtracts the scalar product of the PK and the SK from the ciphertext, subtracts the number of noise bits from the ciphertext, and obtains the plaintext by right-shifting the ciphertext by the number of bits defined by the scaling shift. In doing so, it is possible to accelerate encryption and decryption operations in FHE schemes, especially based on the LWE problem.

Other features and advantages of the present disclosure will be apparent upon reading the following detailed description and reviewing the accompanying drawings.

BRIEF DESCRIPTION OF DRAWINGS

The present disclosure is explained below with reference to the accompanying drawings in which.

DETAILED DESCRIPTION OF THE INVENTION

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatus and method disclosed herein can be implemented in practice by using any numbers of the embodiments provided herein. Furthermore, it should be understood that any embodiment of the present disclosure can be implemented using one or more of the elements presented in the appended claims.

Figure 1:
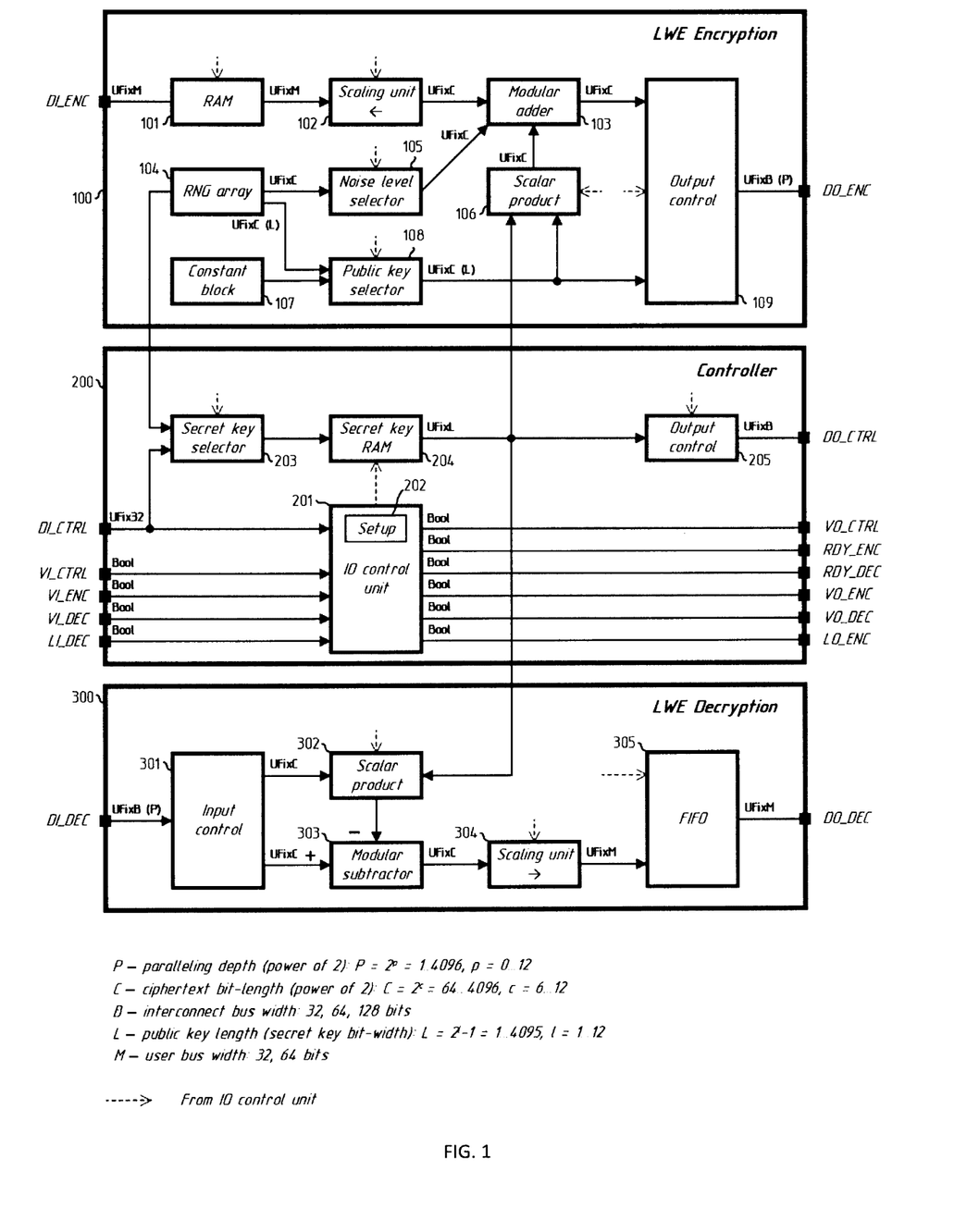
FIG. 1 shows a general block diagram of a fully homomorphic encryption and decryption apparatus according to one exemplary embodiment.

FIG. 1 shows a general block diagram of a fully homomorphic encryption and decryption apparatus according to one exemplary embodiment. The apparatus comprises an encryption module 100, a control module 200, a decryption module 300, and an interconnect bus (not shown) by which the modules 100-300 are connected to each other within the apparatus. The encryption module 100 is configured to receive and encrypt a plaintext into a ciphertext based on a PK and a SK. The decryption module 300 is configured to receive the ciphertext and decrypt it into the plaintext based on the PK and the SK. The control module 200 is configured to control the internal blocks of the encryption and decryption modules 100 and 300, as will be described below in more detail. Each of the modules 100-300 may be implemented as a CPU, general-purpose processor, neuromorphic computing chip, Artificial Intelligence (AI) chip (also referred to as AI hardware), single-purpose processor, microcontroller, microprocessor, application specific integrated circuit (ASIC), field programmable gate array (FPGA), digital signal processor (DSP), complex programmable logic device, or any combination thereof. In a preferred embodiment, each of the modules 100-300 is implemented as an ASIC, FPGA, or their combination.

As follows from FIG. 1, each of the modules 100-300 receives certain input data and generates certain output data. These input and output data are explained below in Table 1.

TABLE 1

| Title | Brief Explanation | Data type |
|---|---|---|
| DI_ENC | Input data for the encryption module 100 | UFixM |
| DO_ENC | Output data for the encryption module 100 | UFixB(P) |
| DI_CTRL | Input data for the control module 200 | UFix32 |
| DO_CTRL | Output data for the control module 200 | UFixB |
| VI_CTRL | Valid input for the control module 200 | Bool |
| VI_ENC | Valid input for the encryption module 100 | Bool |
| VI_DEC | Valid input for the decryption module 300 | Bool |
| RDY_ENC | Ready flag for the encryption module 100 | Bool |
| RDY_DEC | Ready flag for the decryption module 300 | Bool |
| VO_ENC | Valid output for the encryption module 100 | Bool |
| VO_DEC | Valid output for the decryption module 300 | Bool |
| LO_ENC | Last word flag output for the encryption module 100 | Bool |
| LI_DEC | Last word flag input for the decryption module 300 | Bool |
| DI_DEC | Input data for the decryption module 300 | UFixB(P) |
| DO_DEC | Output data for the decryption module 300 | UFixM |

In Table 1 and FIG. 1, UFix refers to an unsigned fixed-point data type, Bool refers to a Boolean data type, M refers to the width of a user bus (by which the plaintext is provided to the encryption module 100), B refers to the width of the interconnect bus, P refers to a degree of parallelism (also herein referred to as the paralleling depth), L refers to a PK length ($L=2^l-1=1 \ldots 4095, l=1 \ldots 12$), and C refers to the bit length of the ciphertext generated by the encryption module 100. It should be known to those skilled in the art that the degree of parallelism is a metric which indicates how many operations may be or are being simultaneously executed by a computing device (in this case, the modules 100-300 of the apparatus).

The control module 200 is configured to receive, from a user, a configuration (or setup) message 202 comprising at least the following: information about a source for a PK, information about a source for a SK, a scaling shift, and a number of noise bits. The configuration message 202 may be configured as a table, in which each bit field corresponds to a certain configurable parameter. One example of a 32-bit configuration message is shown below in Table 2.

TABLE 2

Structure of the configuration message

| Bit field | Description | Default |
|---|---|---|
| 31 | SK_READ - flag of reading the last secret key from memory. | 0 |
| 30 | SK_SRC - secret key source:<br>0 - secret key memory;<br>1 - external key. | 0 |
| 29 | PK_SRC - public key source:<br>0 - random number generator (RNG);<br>1 - constant block. | 0 |
| 28:17 | DELTA - scaling shift (0-4095) | 0 |
| 16:12 | NOISE - number of low-noise bits (0-31) | 0 |

TABLE 2-continued

Structure of the configuration message

| Bit field | Description | Default |
|---|---|---|
| 11:8 | PKL - public key length ($2^{PKL}$-1, PKL = 0 . . . 12) | 0 |
| 7:0 | RESERVED | 0 |

As shown in Table 2, the configuration message may additionally comprise reserved bits (7:0), which may be used for indicating any additional information (e.g., other parameters which should be considered when encrypting the plaintext into the ciphertext). Furthermore, as can be seen from Table 2, the SK may be inputted from an external user device ("1") or generated within the control module 200 ("0"), and the PK may be generated within the encryption module 100 by means of one or more RNGs or retrieved (based on a PKL) from a constant block 107 (or, in other words, a memory sub-module storing a set of PKs each having a different PK length).

The control module 200 obtains the SK based on the source for the SK which is indicated in the configuration message. A secret key selector 203, which is a regular multiplexer, is controlled by the SK_SRC bit in the configuration message 202. An SK memory 204 is a regular dual-port RAM (separate for the encryption and decryption modules 100 and 300), and an output control block 205 comprises blocks similar to blocks 109_4 and 109_5 which are discussed below in detail.

Data is written to the control module 200 through a DI_CTRL line when VI_CTRL=HIGH. The order of writing is as follows: the configuration word (32 bits), followed by the SK (from the 33rd bit until the fall of the VI_CTRL signal). Writing the SK to the memory 204 is performed if bit 30 of the configuration message 202 (i.e., SK_SRC) is set to 1. If it is necessary to read the SK from the memory 204, the SK_READ bit of the configuration message 202 (i.e., bit 31) should be set to one. When reading the SK, the control module 200 outputs VO_CTRL=HIGH.

After that, the control module 200 (via the interconnect bus) provides the SK, the information about the source for the PK, the number of noise bits, and the scaling shift to the encryption module 100, as well as provides the SK, the number of noise bits, and the scaling shift to the decryption module 300.

Figure 2:
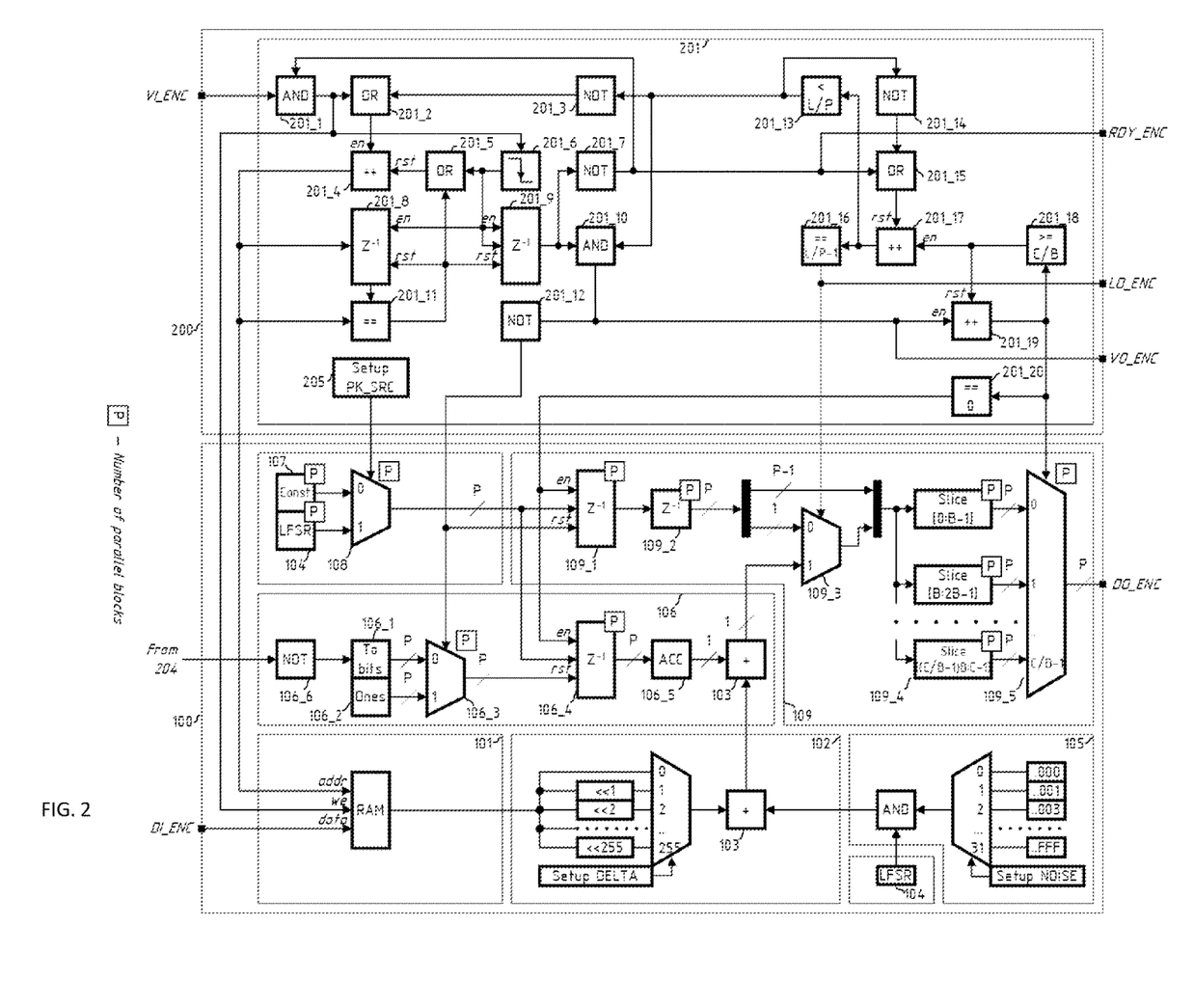
FIG. 2 shows a schematic architecture of an encryption module and a part of a control module responsible for the operation of the encryption module according to one exemplary embodiment.

FIG. 2 shows a schematic architecture of the encryption module 100 and a part of the control module 200 responsible for its operation according to one exemplary embodiment. The operational principle of the encryption module 100 and the corresponding part of the control module 200 will be explained below with reference to FIG. 2 and FIG. 3 (in which clk refers to a system clock, and T refers to . . . ).

When a high-level signal is applied to VI_ENC, provided that the apparatus is not busy, i.e., RDY_ENC=HIGH, the plaintext is written in the form of one or more messages to a memory 101 from a data line DI_ENC. An END gate 201_1 ensures that this condition is met to protect the apparatus from memory collisions. A subsequent OR gate 201_2 selects a source, including a message counter 201_4. When RDY_ENC=HIGH, only VI_ENC can be the source. The counter 201_4 counts and outputs a count result to the address input of a memory 101, while a "write enable" (we) input allows writing as long as VI_ENC=HIGH. The falling edge of VI_ENC is registered by a comparison block 201_6 which generates a strobe signal to store the last value of the message counter 201_4 in a register 201_8. The message counter 201_4 is then reset, and a logical one is written to a write status register 201_9 to indicate that the apparatus can start computations. A NOT gate 201_7 outputs RDY_ENC=LOW and blocks further message writing to the memory 101.

Counters 201_17 and 201_19 are then activated, starting counting from zero. Incrementing occurs when high-level strobes are applied to their enable (en) inputs. Reset strobes (rst) are applied to their inputs to set their values to zero. Since the value of the counter 201_17 after resetting RDY_ENC is zero, a logical one appears at the output of a comparison block 201_13. Together with the logical one stored in the write status register 201_9, the logical one from the comparison block 201_13 starts, via the AND gate 201_10, a counter 201_19 which is responsible for sorting the ciphertext on an output bus DO_ENC and selects the channel of the SK on a multiplexer 106_3. When the value of the counter 201_19 matches the ratio of the ciphertext bit length (C) to the interconnect bus width (B), it is reset using a block 201_18 and starts sorting a next ciphertext word. The strobe generated by the block 201_18 increments the counter 201_19 which controls the output of a desired ciphertext length (L) divided by the degree of parallelism (P). When the value of a counter 201_16 reaches L/P−1, the ciphertext body is outputted on a DO_ENC[P−1] line, and a high-level signal is outputted on a VO_ENC line. When this value is exceeded, the counter 201_19 is reset to zero via the block 201_13 and starts working on a new ciphertext.

The strobe generated by the block 201_13 resets the counter 201_17 via NOT and OR gates 201_14 and 201_15 and increments the counter 201_4 via an inverter 201_3. The counter 201_4 calculates the address of a next message to be extracted from the memory 101. When the number of such strobes matches the value in the register 201_8, a block 201_11 is activated, resetting the counter 201_4 and the registers 201_8, 201_9 to zero, setting an RDY_ENC flag to a logical one, thereby indicating the completion of encryption. An OR gate 201_5 selects the reset source for the counter 201_4.

The operation of the computational blocks of the encryption module 100 is as follows: A message fetched from the memory 101 is left-shifted in a scaling block 102 by a number of bits specified by the DELTA bits in the configuration message 202. Then, the resulting message is summed with noise generated by a noise level selector 105. This selector performs a bitwise operation with randomly generated noise using a predetermined mask selected by the NOISE bits in the configuration message 202. The resulting sum is further combined with the scalar product of the PK and the SK. The SK is provided to the encryption module 100 from the control module 200, while the PK (or, in other words, ciphertext mask) is generated by an array of random number generators (RNG) 104 or extracted from the constant block 107 via a public key selector 108.

A scalar product block 106 is built using registers 106_4 which are cleared according to the SK bits. The inversion of these bits to match the reset line levels is handled by a gate 106_6. The registers are overwritten every time the counter 201_19 is reset. This is monitored by a comparison block 201_20. During the writing process of the memory 101, they remain in the reset state, regulated by the multiplexer 106_3. At this time, ones are applied to rst inputs 106_2. A block 106_1 splits the SK into bits and controls the rst inputs during the computation. The most significant bit of the SK should be zero to ensure that the last word of the ciphertext mask does not affect its body. An accumulator 106_5 is a sum tree that accumulates the result during the encryption process. After outputting the last array of ciphertext words related to a specific message, it is reset. A modular addition block 103 consists of adders with an output bit width limitation equal to the ciphertext bit length.

An output control block 109 captures samples from the array of RNGs 104 synchronously with the scalar multiplication from the block 106 using registers 109_1 and creates delays for channels equal to the delay of the accumulator 106_5 using registers 109_2. A multiplexer 109_3 selects the source of the last channel DO_ENC[P−1] between the mask and the ciphertext body. Blocks 109_4 divide large ciphertext words into fragments or slices corresponding to the interconnect bus width (B), which are then sorted into channels using a multiplexer 109_5.

Figure 3:
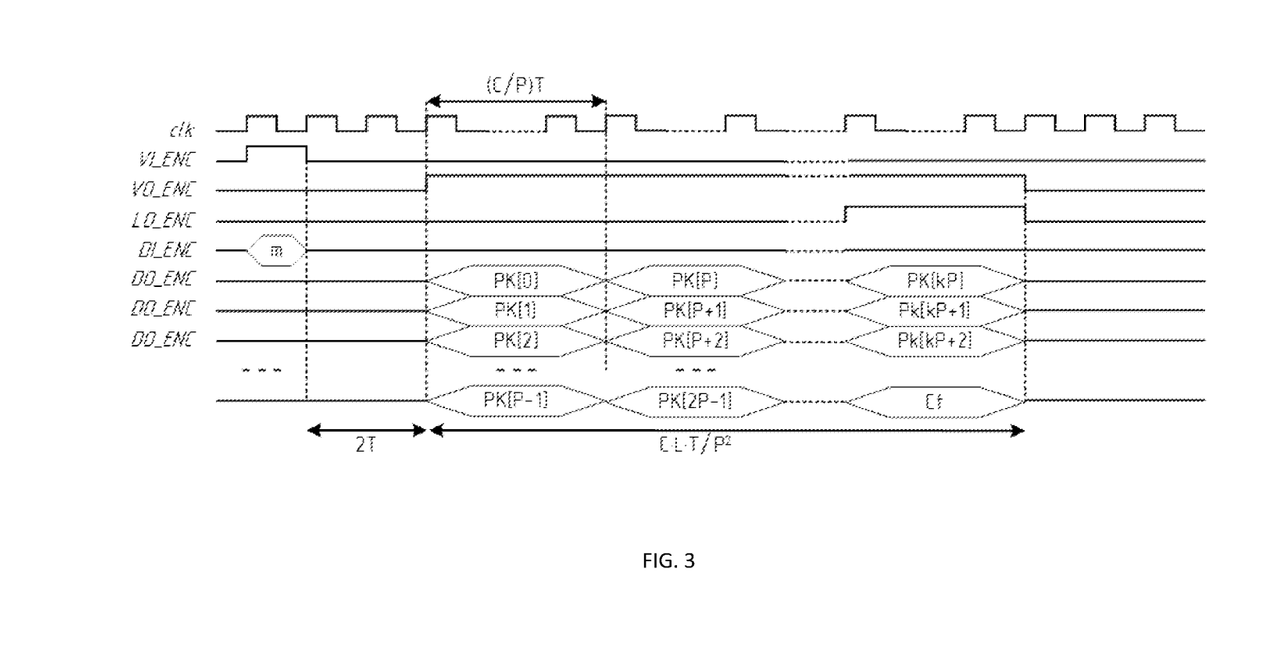
FIG. 3 shows timing diagrams for the operation of the encryption module.

According to FIG. 3, the signal LO_ENC indicates that the current word is the last in the packet. When encrypting multiple consecutive messages, the flag is set at the end of each ciphertext output. The signal VO_ENC is set to one at the beginning of transmitting the first ciphertext and reset to zero after the last one is outputted.

Figure 4:
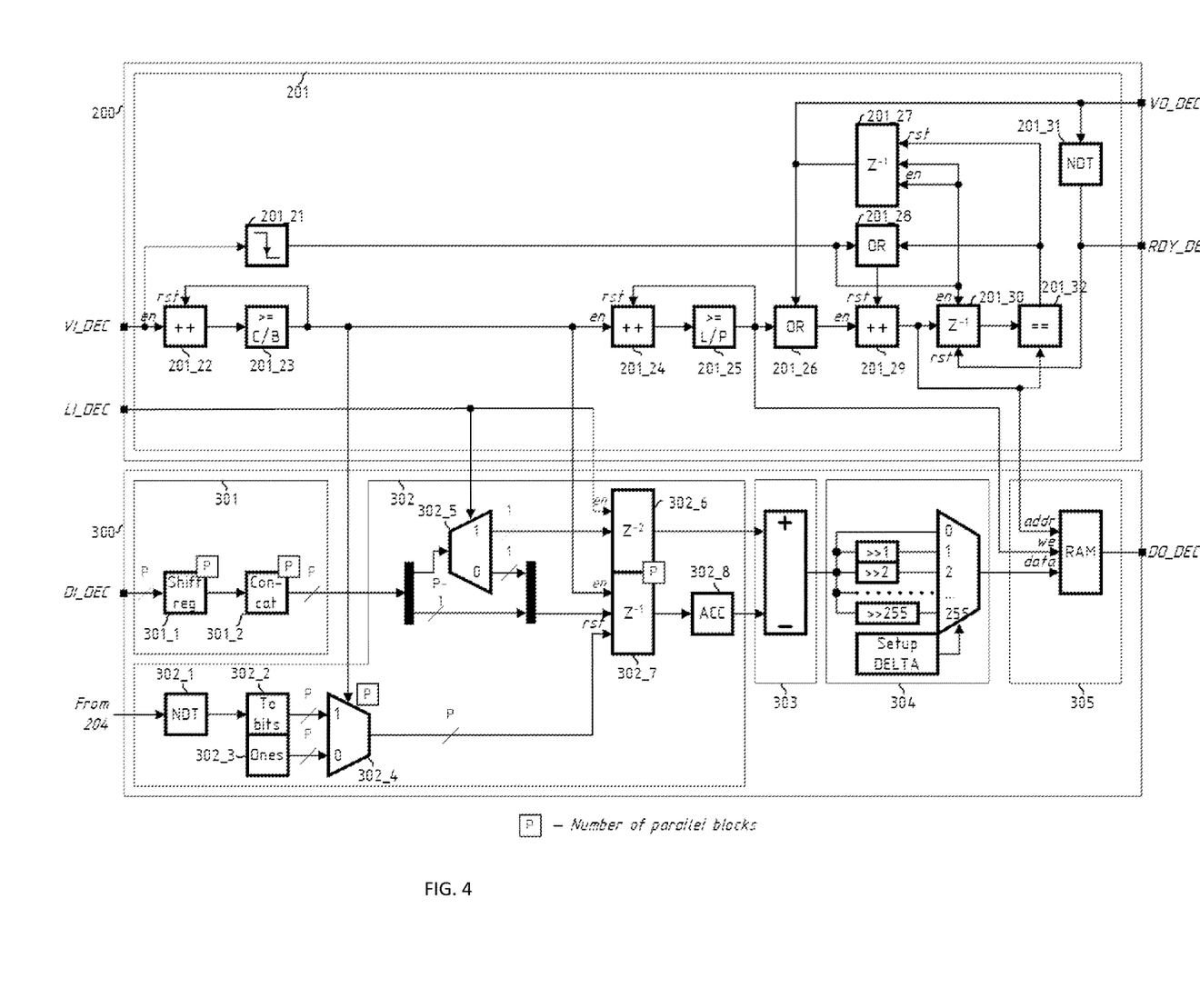
FIG. 4 shows a schematic architecture of a decryption module and a part of the control module responsible for the operation of the decryption module according to one exemplary embodiment.
Figure 5:
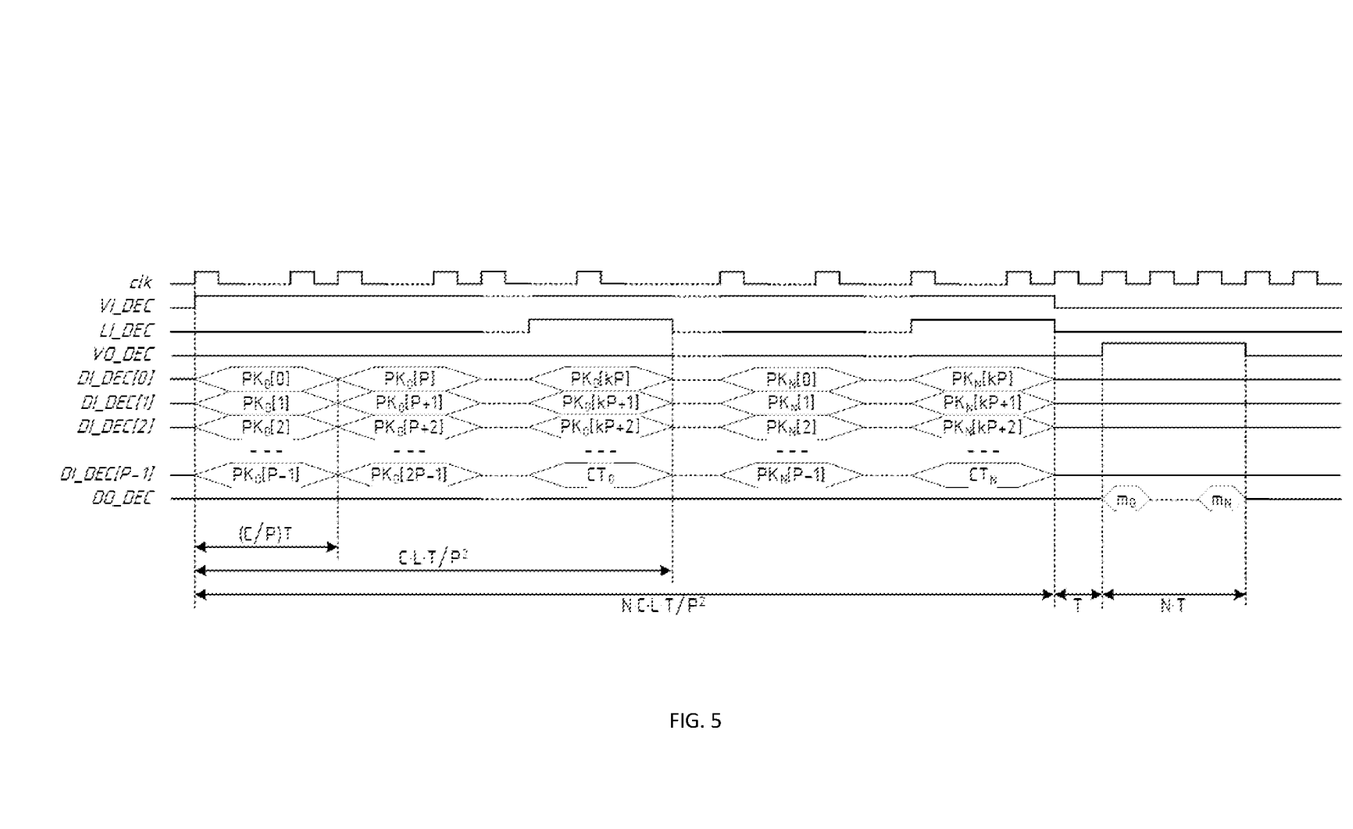
FIG. 5 shows timing diagrams for the operation of the decryption module.

FIG. 4 shows a schematic architecture of the decryption module 300 and a part of the control module 200 responsible for its operation according to one exemplary embodiment. The operational principle of the decryption module 300 and the corresponding part of the control module 200 will be explained below with reference to FIG. 4 and FIG. 5.

A scalar product block 302, a scaling block 304, and a modular subtractor block 303 operate in the same way as the corresponding blocks in the encryption module 100, with the only difference being that the scaling block 304 performs a right shift and the subtractor block 303 is used instead of the modular addition block 103.

An input control block 301 performs the opposite function compared to the output control block 109 in the encryption module 100. When VI_DEC is at a high level, it collects fragments or slices of the ciphertext from the DI_DEC lines using shift registers 301_1 and concatenation blocks 301_2.

During the decryption process, the control module 200 operates as follows. During the activity of a VI_DEC line (high level), a counter 201_22 is active. The value of this counter is read by a block 201_23 which generates a strobe when the condition C/B is met. This strobe captures the received words in registers 302_6 and 302_7. Additionally, the strobe selects the channel of the SK on a multiplexer 302_4. The inverted bits of the SK activate the rst inputs of the registers 302_7 according to their values, thereby performing the multiplication of the SK and PK keys. The results of these multiplications are accumulated by an accumulator 302_8 which outputs the scalar product.

The strobes from the block 201_23 are counted by a counter 201_24. When the value of this counter becomes equal to L/P−1, the signal LI_DEC is triggered, allowing a demultiplexer 302_5 to extract the ciphertext body from the stream. The difference between the ciphertext body and the scalar product of the PK and SK is calculated in the block 303. The result is scaled in the block 304 and stored in a memory 305.

The address of the memory 305 is calculated by a counter 201_29 which counts the strobes from a block 201_25. These strobes pass through an OR gate 201_26 and occur each time the counter 201_24 reaches the value L/P.

The number of strobes corresponding to the number of messages is stored in a register 201_30 when the VI_DEC signal falls, detected by a block 201_21. When VI_DEC falls, the counter 201_29 is also reset, and the end-of-packet flag is stored in a register 201_27. This flag triggers the counter 201_29, starts the data unloading from the memory 305, and a high-level signal appears on the VO_DEC line. The RDY_DEC signal is low, which prevents the decryption module 300 from receiving new ciphertexts.

The data unloading from the memory 305 onto the DO_DEC line continues until the value of the counter 201_29 matches the value in the register 201_30. At this moment, a block 201_32 clears the flag in the register 201_27. As a result of this event, the register 201_30 is reset through a block 201_31, VO_DEC transitions to LOW, RDY_DEC goes HIGH, and the decryption module 300 is ready to receive data again.

The apparatus comprising the modules 100-300 described above with reference to the figures may generally perform encryption in $CL/P^2+2$ clock cycles and decryption in $CL/P^2+1$ clock cycles. In a fully parallel scheme implemented on an FPGA, encryption may take two clock cycles, and decryption may take one clock cycle.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A fully homomorphic encryption and decryption apparatus comprising:
   an encryption module;
   a decryption module;
   a control module; and
   an interconnect bus configured to connect the encryption module, the decryption module and the control module to each other, the interconnect bus having a bus width;
   wherein the control module is configured to:
      receive a configuration message comprising:
         information about a source for a public key (PK);
         information about a source for a secret key (SK);
         a scaling shift; and
         a number of noise bits;
      obtain the SK based on the information about the source for the SK;
      provide, via the interconnect bus, the SK, the information about the source for the PK, the number of noise bits, and the scaling shift to the encryption module; and
      provide, via the interconnect bus, the SK, the number of noise bits, and the scaling shift to the decryption module;
   wherein the encryption module is configured to:
      (i) obtain the PK based on the information about the source for the PK;
      (ii) receive a plaintext;
      (iii) left-shift the plaintext by a number of bits defined by the scaling shift;
      (iv) after said left-shifting, add the number of noise bits to the plaintext;
      (v) after said adding, obtain a ciphertext by combining the plaintext with a scalar product of the PK and the SK, the ciphertext having a bit length;
      (vi) divide the ciphertext into a set of ciphertext slices based on the bus width of the interconnect bus and the bit length of the ciphertext; and (vii) concurrently provide each ciphertext slice of the set of ciphertext slices together with the PK to the interconnect bus; and wherein the decryption module is configured to:

(viii) concatenate the set of ciphertext slices into the ciphertext;

(ix) subtract the scalar product of the PK and the SK from the ciphertext;

(x) after said subtracting the scalar product of the PK and the SK, subtracting the number of noise bits from the ciphertext; and (xi) after said subtracting the number of noise bits, obtain the plaintext by right-shifting the ciphertext by the number of bits defined by the scaling shift.

2. The apparatus of claim 1, wherein the encryption module comprises at least one random number generator (RNG), and the information about the source for the PK indicates the at least one RNG as the source for the PK and a target length of the PK, and wherein the encryption module is configured to obtain the PK by triggering the at least one RNG based on the target length of the PK.

3. The apparatus of claim 1, wherein the encryption module comprises a memory sub-module configured to store a set of PKs each having a different PK length, and the information about the source for the PK indicates the memory sub-module as the source for the PK and a target length of the PK, and wherein the encryption module is configured to obtain the PK by accessing the memory sub-module and selecting the PK from the set of PKs based on the target length of the PK.

4. The apparatus of claim 1, wherein the information about the source for the SK indicates an external user device as the source for the SK, and wherein the control module is configured to receive the SK from the external user device.

5. The apparatus of claim 1, wherein the control module comprises a memory sub-module configured to store a set of SKs, and the information about the source for the SK indicates the memory sub-module as the source for the SK and a target length of the SK, and wherein the control module is configured to obtain the SK by accessing the memory sub-module and selecting the SK from the set of SKs based on the target length of the SK.

6. The apparatus of claim 1, wherein each of the encryption module, the decryption module and the control module is implemented based on at least one of a Field-Programmable Gate Arrays (FPGA) and an Application Specific Integrated Circuits (ASIC).

7. The apparatus of claim 1, wherein the encryption module is configured to perform operations (i)-(vii) in $CL/P^2+2$ clock cycles, and the decryption module is configured to perform operations (viii)-(xi) in $CL/P^2+1$ clock cycles, where C is the bit length of the ciphertext, L is a PK length of the PK, and P is a degree of parallelism provided by each of the encryption module and the description module.

8. A method for operating the fully homomorphic encryption and decryption apparatus according to claim 1, the method comprising:

by using the control module:
receiving a configuration message comprising:
information about a source for a public key (PK);
information about a source for a secret key (SK);
a scaling shift; and
a number of noise bits;
obtaining the SK based on the information about the source for the SK;
providing, via the interconnect bus, the SK, the information about the source for the PK, the number of noise bits, and the scaling shift to the encryption module; and
providing, via the interconnect bus, the SK, the number of noise bits, and the scaling shift to the decryption module;

by using the encryption module:
obtaining the PK based on the information about the source for the PK;
receiving a plaintext;
left-shifting the plaintext by a number of bits defined by the scaling shift;
after said left-shifting, adding the number of noise bits to the plaintext;
after said adding, obtaining a ciphertext by combining the plaintext with a scalar product of the PK and the SK, the ciphertext having a bit length;
dividing the ciphertext into a set of ciphertext slices based on the bus width of the interconnect bus and the bit length of the ciphertext; and
concurrently providing each ciphertext slice of the set of ciphertext slices together with the PK to the interconnect bus; and by using the decryption module:
concatenating the set of ciphertext slices into the ciphertext;
subtracting the scalar product of the PK and the SK from the ciphertext;
after said subtracting the scalar product of the PK and the SK, subtracting the number of noise bits from the ciphertext; and
after said subtracting the number of noise bits, obtaining the plaintext by right-shifting the ciphertext by the number of bits defined by the scaling shift.

\* \* \* \* \*